United States Patent
Brandt et al.

(12) 
(10) Patent No.: US 6,700,746 B1
(45) Date of Patent: Mar. 2, 2004

(54) DISK DRIVE SUSPENSION HAVING CONTROLLED SLIDER ATTACHMENT

(75) Inventors: Kim Brandt, Boulder, CO (US); Chris Broussalian, Loveland, CO (US); Joel Groebner, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/975,645

(22) Filed: Oct. 10, 2001

Related U.S. Application Data

(60) Provisional application No. 60/323,594, filed on Sep. 19, 2001.

(51) Int. Cl.[7] .............................. G11B 21/16; G11B 5/48
(52) U.S. Cl. ................................................. 360/245.4
(58) Field of Search ........................... 360/245.4, 245.3, 360/245.2, 245, 244.2, 244, 240

(56) References Cited

U.S. PATENT DOCUMENTS

| | | | | |
|---|---|---|---|---|
| H1424 H | * | 4/1995 | Budde | ..................... 360/245.5 |
| 5,759,418 A | * | 6/1998 | Frater et al. | ................... 216/22 |
| 5,943,190 A | * | 8/1999 | Fanslau, Jr. | .............. 360/245.3 |
| 5,973,884 A | * | 10/1999 | Hagen | ..................... 360/245.3 |

\* cited by examiner

Primary Examiner—Hoa T. Nguyen
Assistant Examiner—Julie Anne Watko
(74) Attorney, Agent, or Firm—Sheridan Ross P.C.

(57) ABSTRACT

The suspension of a disk drive incorporates controlled attachment of the gimbal to the slider. The gimbal has at least one wall or enclosure formed on its contact surface which receives a desired amount of adhesive or solder paste. The wall or enclosure confines the adhesive or paste to an exact location and also controls the amount of adhesive or paste that contacts the slider upon assembly. This controlled attachment between the gimbal and slider enhances performance of the read/write head attached to the slider. Use of a meltable solder paste also allows the suspension to be reworked by improving the ability to separate the slider from the gimbal after initial assembly. The contact surface of the gimbal may be modified to include a metallic strip which contacts the adhesive. Use of an electrically conductive bonding material in combination with the metallic strip assists in dissipating electric static which may build up on the read/write head.

55 Claims, 1 Drawing Sheet

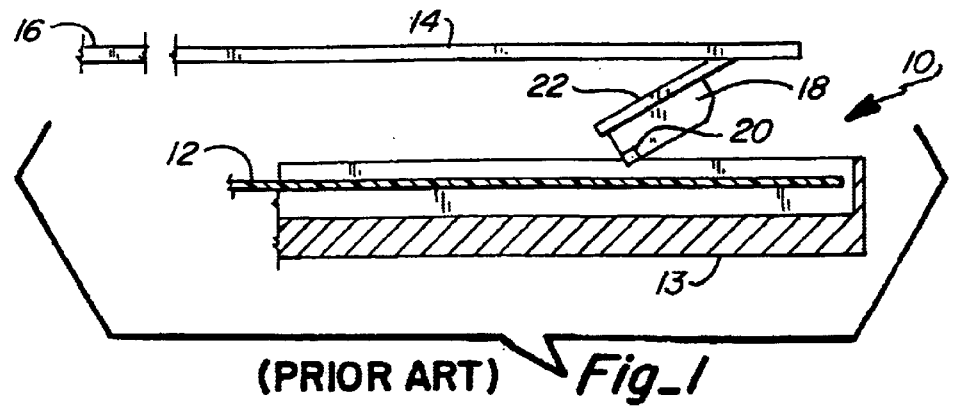
(PRIOR ART) *Fig_1*
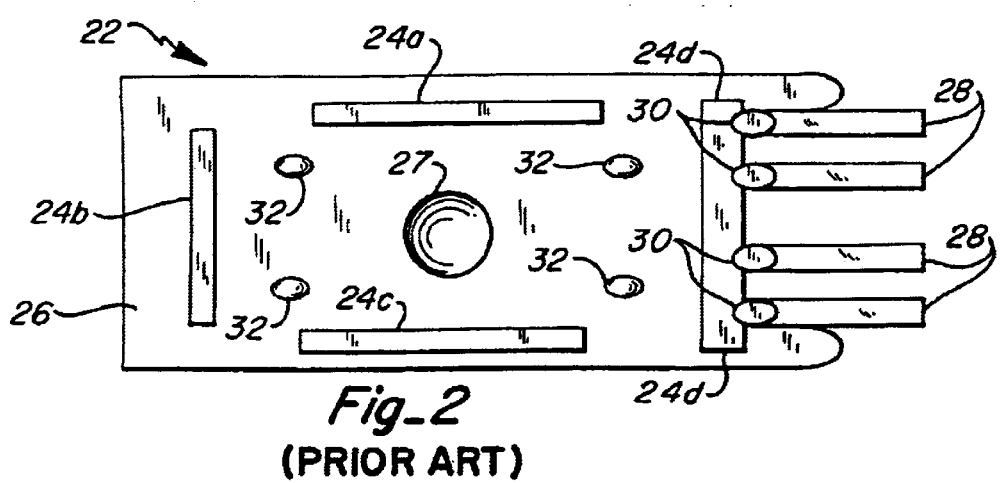
*Fig_2*
(PRIOR ART)
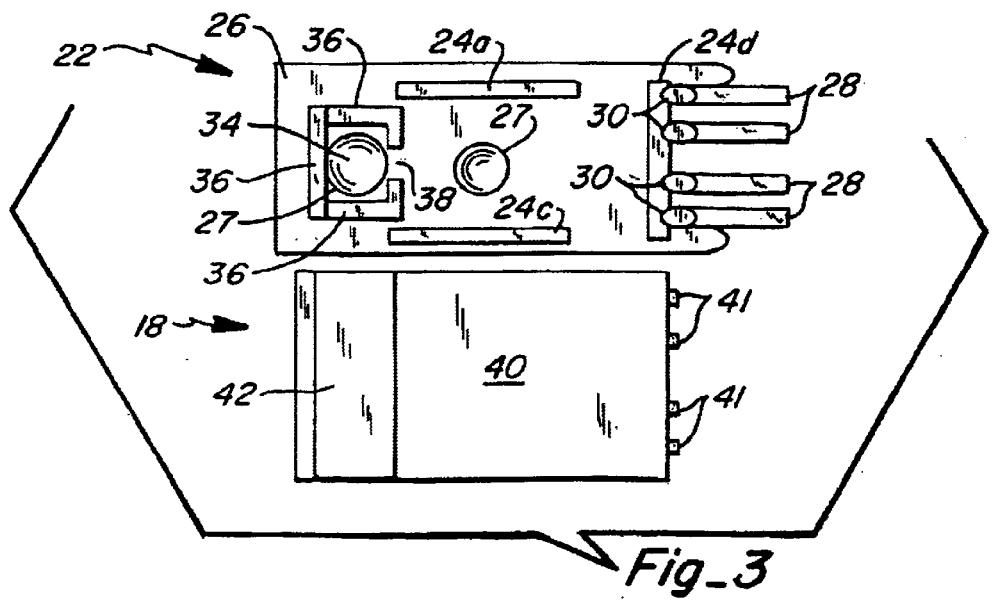
*Fig_3*

DISK DRIVE SUSPENSION HAVING CONTROLLED SLIDER ATTACHMENT

RELATED APPLICATIONS

The present application claims priority under 35 U.S.C.§ 119(e) from U.S. Provisional Patent Application Ser. No. 60/323,594 filed Sep. 19, 2001, which provisional application is incorporated herein by reference in its entirety.

FIELD OF THE INVENTION

This invention relates to the field of computer disk drives, and more particularly to a method for attaching a slider to a suspension in a controlled manner that provides consistent bonding characteristics between the slider and suspension thus improving performnance of the disk drive.

BACKGROUND OF THE INVENTION

Magnetic disk drives typically utilize one or more disks mounted to a rotatable hub. The hub in turn is connected to a spindle motor which can rotate the disk at speeds in excess of 7,000 revolutions per minute. Read/write heads, or transducers, are positioned relative to tracks on the disks for reading data from and writing data to the disks. The read/write heads are positioned by rotary actuator arm assemblies. A rotary actuator arm assembly typically comprises an actuator arm, a suspension arm or load beam, and a slider. The actuator arm is attached to a spindle and rotates by action of a voice coil motor. The suspension arm or load beam is attached to the actuator arm. The slider is then attached to the free distal end of the suspension arm. The suspension arm biases the slider toward the surface of the disk. A read/write head or transducer is fixed to the slider. The transducer is typically adhered to the trailing end of the slider, but may be affixed at other locations on the slider body. Sliders are designed to either fly just above the surface of the disk or to actually contact the disk as it rotates. In order to maintain consistent flight characteristics, it is important that each slider be mounted to its corresponding suspension arm in an accurate and consistent manner. Inconsistent mounting of the slider can affect the aerodynamics of the slider, causing it to be misaligned relative to the tracks on the disk. Such misalignment can cause read/write errors, and can otherwise negatively affect disk drive performance.

Adhesive is used to attach the slider to the suspension arm. Previously, there have been inadequate control measures adopted to positively control the amount of adhesive applied, or to control the exact locations where adhesive is applied. As a result, sliders are bonded to the suspension arms in an inconsistent manner which ultimately affects the performance of the slider. For example, after adhesive has been applied, the adhesive must be cured which involves heat drying of the slider and suspension arm. Typically, the slider is made of a ceramic material and the suspension arm is metallic. Accordingly, these components expand and contract at different rates in response to the heated drying. If the adhesive is not placed at consistent locations in consistent amounts, the expansion and contraction which takes place in the heated drying process causes inconsistent forces being applied to the slider, resulting in twisting, crowning and/or cambering of the slider. Thus, sliders will be inconsistently mounted to suspension arms and will perform inconsistently. This will result in potential read/write errors and other associated problems among disk drives and even among head assemblies within a single disk drive.

Another problem associated with prior art methods of attaching a slider to a suspension arm is that the type of adhesive used is not conducive to allow reworking of the device. More specifically, previous adhesives use permanent bonding agents which create a permanent bond between the suspension arm and the slider. Therefore, should either the transducer or the suspension assembly fail in testing, it is necessary to replace the entire suspension assembly rather than separating the two components and reusing the satisfactory component.

Finally, static build up in the head assembly is a common problem with all disk drives. Excessive static build up in the suspension transferred to the disk can result in corruption of data in the disk tracks, as well as actual damage to the disk tracks themselves, which manufacturers seek to create a conductive path from the head assembly through the actuator assembly to ground any static build up, improved methods of dissipating electrostatic build up are always sought.

SUMMARY OF THE INVENTION

The present invention solves the foregoing problems by providing a method for attaching a slider to a suspension arm in a consistent, controlled and reliable manner. Polyimide walls are positioned to form a perimeter adhesive zone or area on the attachment surface of the gimbaled flexure or gimbal. The gimbal is the portion of the suspension arm which attaches to the slider. The space inside the walls is filled with adhesive which becomes active upon heating. The slider is then brought in contact with the gimbal of the suspension arm. The suspension arm and slider are subsequently heated to cause the adhesive to turn to a flowable state. Removing the heat causes the adhesive to solidify and adhere the slider to the gimbal. However, because the slider is ceramic and the gimbal is metal, they expand and contract at different rates. This results in different forces applied to the slider, causing unpredictable twisting, crowning and cambering of the slider. The polyimide walls ensure a controlled placement of an adhesive zone and, thereby, consistent placement of the adhesive and of the slider relative to the suspension arm. An opening formed in the wall creates a break or gap allowing excess adhesive to flow out of the bonding area. The excess flows in a controlled manner without contacting other parts of the components thus maintaining a consistent bonding area.

In order to improve reworkability of the disk drive, and particularly the connection between the slider and suspension arm, the adhesive used may be a reworkable solder paste. Upon reheating, the solder paste would melt, thus allowing easy removal of the slider from the suspension. Another material which can be used to improve reworkability is a thermal plastic adhesive which would become liquid upon reheating.

In order to help create a sufficient bond between the slider and the suspension, the surface of the slider which attaches to the suspension could be provided with a metallic film which would be placed in alignment for contact with the adhesive zone. This metallic film may be applied to the slider by sputtering or other deposition processes. Another advantage of employing the metallic film on the slider is to provide a conductive path for removing static from the head/transducer. Accordingly, static can be. dissipated through the metallic film on the slider, through the solder paste, or any other conductive adhesive, and through the suspension arm and actuator arm until it is grounded in the housing of the disk drive.

The present method of attachment further is conducive to an automated assembly. The reservoir or pocket created by the polyimide walls creates a consistent location for adhesive placement and the opening in the wall allows excess adhesives to be utilized without detriment. In turn, a consistent, reliable and stronger bond is created between the slider and suspension arm. Automation enhances the output of the assembly process.

BRIEF DESCRIPTION OF THE DRAWINGS

FIG. 1 is a diagramatic side elevation of a suspension assembly or head gimbal assembly;

FIG. 2 is a simplified top plan view of a prior art gimbaled flexure or gimbal, and the manner in which adhesive is typically applied to the gimbal; and FIG. 3 is a simplified top plan view of a gimbal, and the contact surface of the slider which is attached to the gimbal, the slider and gimbal incorporating the features of the invention.

DETAILED DESCRIPTION

FIG. 1 shows a simplified and conventional head-gimbal or suspension assembly 10 positioned proximate an information or data disk 12 mounted within a housing 13 of the disk drive. The specific construction of the suspension has been greatly simplified to simply show the relative positioning of the components with respect to the disk. The suspension arm 16 is attached to a rotary actuator (not shown). As will be explained in greater detail below, a slider 18 is attached to the gimbal 22 of the flexure 14. The slider 18 contains one or more transducers or heads 20 which read information resident on the disk 12 or write information to the disk 12. While the heads 20 are shown at the trailing edge of the slider 18, it should be appreciated that the heads 20 can be positioned at various locations relative to the slider. The head-gimbal assembly ("HGA") 10 generally comprises a flexure 14 forming the distal end of a suspension arm 16, a slider 18 and a transducer or head 20.

In operation, the disk 12 is rotated at a high speed, causing the aerodynamic properties of the slider 18 to position the slider 18 and, more importantly, the head 20, relative to the disk surface for read and/or write operations. Depending upon the particular disk drive construction, the slider 18 may be in contact with the rotating disk 12 or may fly a relatively small distance above the disk 12. Given the small physical size of the gimbal 22 and the slider 18, the assembly of these components has always been challenging. To obtain consistent performance from one drive to the next, it is desirable that the slider 18 be attached to the gimbal 22 in a repeatable and consistent manner.

In previous disk drives, as shown in the simplified diagram of FIG. 2, the gimbal 22 includes raised polyimide surfaces or walls 24a–d, which extend from the surface 26 of the gimbal 22 to offset the height of the slider 18 from the gimbal 22. An alignment mark or index point in the form of a dimple 27 or other type of surface marking is typically found on the surface 26. Despite this index point, repeatable final alignment between the slider and the suspension arm is virtually impossible because of the problems associated with uncontrolled application and curing of adhesive. Electrical traces 28 are shown attached to the gimbal 22 along at least one lateral edge and terminate at contact points 30 along one polyimide wall 24d. The contact points 30 connect to the slider 18 at corresponding bond pad points, as further discussed below.

As also shown in FIG. 2, adhesive 32 is applied to the surface 26 of the gimbal along various points. The adhesive 32 may be applied manually or automatically. However, in either method, the precise amount and location of the adhesive 32 would vary among HGAs. As a result, because of the heat processes used to set the adhesive bond between the slider 18 and the gimbal 22, imprecise or inconsistent placement of the adhesive and/or varying amounts of adhesive adversely import an uncontrolled crown, camber and/or twist to the slider 18. Because the slider 18 is ceramic and the suspension 14, including the gimbal 22, is metal, each component piece will have different rates of thermal expansion and contraction. Thus, when the two components have been subjected to heat for purposes of setting or curing the bond between them, the subsequent contraction during cooling will create stress forces between the two components. The quantity and direction of these forces will vary based upon the location of the adhesive and the quantity or volume of adhesive used. The result is that an unpredictable crown, camber and/or twist can be created in the slider 18 due to these forces which, in turn, can affect the flying characteristics and performance of the slider 18 and transducer 20, respectively. Of course, these forces can also be used to an advantage, for example, by intentionally imparting a crown to the slider 18 for improved performance. However, such advantages cannot be achieved if the bonding process is not consistent and repeatable from one disk drive to the next.

Turning to FIG. 3, a simplified version of a gimbal 22 is shown again which incorporates the features of the invention. As shown, an adhesive zone or area 34 is defined within a raised polyimide wall or enclosure 38. The zone 34 is filled with an adhesive or solder paste 36 which has an upper surface that extends above the upper surface or edge of the wall 38. Due to the viscosity of the adhesive or paste, it will still remain trapped within wall 38. The raised polyimide wall 38 is made by photo-etching processes well known in the art The wall 38 may be continuous, or may be formed in abutting sections. Photo etching is a process which can create very fine patterns of walls on the gimbal 22. Thus, the adhesive zone 34 can be configured for precise and consistently repeatable application of an adhesive in term of both quantity and location. The polyimide wall 38 can be made with an opening 40 to allow adhesive to escape during the setting and curing process. In this manner, volumetric control of the adhesive or paste 36 has some flexibility. As the adhesive liquefies, any excess can escape through the opening 40 without altering the bond between the slider 18 and the flexure portion 22. As the excess escapes, it will flow at a height less than the adhesive or paste which remains within the adhesive zone 34. Accordingly, this escaping adhesive will not make contact with the slider, and will harmlessly settle on the surface 26. While it is desirable to control the amount of adhesive applied, this opening 40 clearly improves the repeatability in application of adhesive, and can compensate for various manufacturing tolerances in application of the adhesive. It should also be appreciated that the shape of the polyimide wall 38 can vary. It need not be square, but may be any shape and size sufficient to retain adhesive for purposes of bonding the slider 18 to the gimbal 22 in addition to configuring the wall 38 of a specific size and shape, the wall 38 may also be constructed at a desired height in order to accommodate the quantity of adhesive to be placed therein FIG. 3 illustrates a single wall or en closure for creating a single zone 34; however, it will be appreciated that one or more zones may be created by incorporating corresponding additional walls because of the great flexibility in the photo etching process which allows exact placement of polyimide structures.

In order to improve drive reworkability, a solder paste can be used as opposed to a permanent adhesive. As a result, should the disk drive need to be reworked, the solder can be heated to thereby free the bond between the slider 18 and the gimbal 22. Similarly, the bond between the contact points 30 and the bond pads 42 on the slider can be heated to release those connections. Thus, the slider can be removed without any damage to the HGA, allowing the components to be reused as appropriate.

In addition, and to improve the safe discharge of static electricity, the attachment surface 44 of the slider 18, may include a metallic portion 46. This creates a conductive path from the slider 18, through the solder and metallic portion 46, into the suspension 16 and actuator assembly, and away from the disk. The metallic portion 44 is shown as a strip of metal. However, it will be understood that this metallic portion may be sized and located to match the particular size and number of zones 34, and the metallic portion may be of a desired thickness which adequately dissipates static electricity, and also provides an adequate bonding surface.

The invention has been described with respect to a particular embodiment thereof; however, it will be appreciated that changes and modifications may be made which fall within the spirit and scope of the invention.

What is claimed is:

1. A suspension for a disk drive, said suspension comprising:
   a suspension arm having proximal and distal ends;
   a gimbal forming a distal portion of said suspension arm, said gimbal having a contact surface including at least one enclosure formed thereon, said enclosure defining an adhesive zone therein; and
   a slider attached to said gimbal at said adhesive zone, wherein an adhesive is applied to selectively fill said adhesive zone thus controlling the location and quantity of adhesive connecting the slider to the gimbal.

2. A device, as claimed in claim 1, wherein:
   said enclosure includes a plurality of enclosures selectively placed on said contact surface, each one of said plurality of enclosures having a corresponding adhesive zone formed therein.

3. A device, as claimed in claim 1, wherein:
   said enclosure has an opening defining a gap between portions of said enclosure, said opening enabling excess adhesive to flow therethrough.

4. A device, as claimed in claim 1, wherein:
   said slider further includes a metallic portion formed thereon and aligned for contact with said adhesive in said adhesive zone.

5. A device, as claimed in claim 1, wherein:
   said adhesive is an electrically conductive bonding material.

6. A device, as claimed in claim 5, wherein:
   said electrically conductive bonding material is solder paste.

7. device, as claimed in claim 5, wherein:
   said electrically conductive bonding material is epoxy.

8. A device, as claimed in claim 5, wherein:
   said electrically conductive bonding material is anisotropic conductive film.

9. A device as claimed in claim 1, wherein:
   said enclosure defines a rectangular adhesive zone.

10. A device as claimed in claim 1, wherein:
    said enclosure defines a multisided adhesive zone.

11. A suspension fir a disk drive, said suspension comprising:
    a suspension arm having proximal and distal ends;
    a gimbal forming a distal portion of said suspension arm, said gimbal having a contact surface including means on said surface for forming an enclosure, said forming means defining an adhesive zone therein; and
    a slider attached to said gimbal Sat said adhesive zone, wherein an adhesive is selectively applied to said adhesive zone thus controlling the location and quantity of adhesive connecting the slider to the gimbal.

12. A device, as claimed in claim 11, wherein:
    said forming means includes a plurality of forming means selectively placed on said contact surface, each of said plurality of forming means having a corresponding adhesive zone formed therein.

13. A device, as claimed in claim 11, wherein:
    said forming means has an opening defining a gap between portions of said forming means, said opening enabling adhesive to flow therethrough.

14. A device, as claimed in claim 11, wherein:
    said slider further includes a metallic portion formed thereon and aligned for contact with said adhesive in said adhesive zone.

15. A device, as claimed in claim 11, wherein;
    said adhesive is an electrically conductive bonding material.

16. A device, as claimed in claim 15, wherein:
    said electrically conductive bonding material is solder paste.

17. A device, as claimed in claim 15, wherein:
    said electrically conductive bonding material is epoxy.

18. A device, as claimed in claim 15, wherein:
    said electrically conductive bonding material is anisotropic conductive film.

19. A suspension for a disk drive, said suspension comprising:
    a suspension arm;
    a gimbal forming a distal portion of said suspension arm, said gimbal having a contact surface including at least one enclosure formed thereon, said enclosure defining an adhesive zone therein, said enclosure having a plurality of interconnected walls traversing continuously along said contact surface and extending away from the contact surface; and
    a slider attached to said gimbal at said adhesive zone.

20. A suspension, as claimed in claim 19, wherein:
    said enclosure has a rectangular shape.

21. A suspension, as claimed in claim 19, wherein:
    said enclosure further includes a gap positioned between two walls of said plurality of walls.

22. A suspension, as claimed in claim 21, wherein:
    said gap faces a center of said contact surface.

23. A suspension, as claimed in claim 19, wherein:
    said plurality of walls include at least a pair of orthogonal walls.

24. A suspension, as claimed in claim 23, wherein:
    said enclosure further includes a gap positioned between said at least a pair of orthogonal walls.

25. A suspension, as claimed in claim 19, wherein:
    said contact surface further includes a pair of offset walls extending substantially parallel to one another for providing an offset between said slider and said gimbal, each said pair offset walls being spaced from said enclosure.

26. A suspension, as claimed in claim 25, wherein:

said contact surface further includes a third wall extending substantially perpendicular to said pair of offset walls, and said third wall being spaced from said enclosure.

27. A suspension, as claimed in claim 25 wherein:

said plurality of walls and said pair of offset walls have substantially the same thickness.

28. A suspension, as claimed in claim 25, wherein:

said plurality of walls and said pair of offset walls have substantially the same height.

29. An enclosure, as claimed in claim 25, wherein:

said plurality of walls and said pair of offset walls are made of the same material.

30. A suspension, as claimed in claim 25, wherein:

said enclosure and said pair of offset walls are made of polyimide.

31. A suspension, as claimed in claim 25, wherein:

said pair of offset walls provide an the offset from said slider, but do not adhere to said slider.

32. A suspension, as claimed in claim 19, wherein:

said slider further includes a metallic portion formed thereon and aligned for contact with said adhesive zone.

33. A suspension, as claimed in claim 19, further including:

adhesive selectively applied to said adhesive zone for controlling the location and quantity of adhesive connecting the slider to the gimbal.

34. A suspension for a disk drive, said suspension comprising:

a suspension arm;

a gimbal forming a distal portion of said suspension arm, said gimbal having a contact surface including means on said surface for forming an enclosure thereon, said means for forming an enclosure having at least one wall extending continuously and unbroken in a desired pattern thereby controlling the location and quantity of adhesive placed in said enclosure; and a slider attached to said gimbal at said adhesive zone.

35. A suspension, as claimed in claim 34, wherein:

said means for forming an enclosure has a rectangular shape.

36. A suspension, as claimed in claim 34, wherein:

said at least one wall includes a plurality of continuous walls.

37. A suspension, as claimed in claim 34, wherein:

said means for forming an enclosure includes a gap positioned between ends of said at least one wall.

38. A suspension, as claimed in claim 37, wherein:

said gap faces a center of said contact surface.

39. A suspension, as claimed in claim 34, wherein:

said at least one wall includes at least a pair of orthogonal walls.

40. A suspension, as claimed in claim 39, wherein:

said at least one wall further includes a gap positioned between said at least a pair of orthogonal walls.

41. A suspension, as claimed in claim 34, wherein:

said contact surface further includes a pair of offset walls extending substantially parallel to one another for providing an offset between said slider and said gimbal, and each said pair of offset walls being spaced from said means for forming an enclosure.

42. A suspension, as claimed in claim 41, wherein:

said contact surface further includes a third wall extending substantially perpendicular to said pair of offset walls, and said third wall being spaced from said means for forming an enclosure.

43. A suspension, as claimed in claim 41, wherein:

said means for forming an enclosure and said pair of offset walls have substantially the same thickness.

44. A suspension, as claimed in claim 41, wherein:

said means for forming an enclosure and said pair offset walls have substantially the same height.

45. An enclosure, as claimed in claim 41, wherein:

said means for forming an enclosure and said pair of offset walls are made of the same material.

46. A suspension, as claimed in claim 41 wherein:

said means for forming an enclosure and said pair of offset walls are made of polyimide.

47. A suspension, as claimed in claim 41, wherein:

said pair of walls provide the offset from said slider, but do not adhere to said slider.

48. A suspension, as claimed in claim 34, wherein:

said slider further includes a metallic portion formed thereon and aligned for contact with said adhesive zone.

49. A suspension, as claimed in claim 34, further including:

adhesive selectively applied to said adhesive zone for controlling the location and quantity of adhesive connecting the slider to the gimbal.

50. A suspension for a disk drive, said suspension comprising:

a suspension arm;

a gimbal forming a distal portion of said suspension arm, said gimbal having a contact surface including at least one enclosure formed thereon, said enclosure defining an adhesive zone therein;

a slider attached to said gimbal at said adhesive zone;

said enclosure includes a plurality of walls, and a gap positioned between said walls; and said gap faces a center of said contact surface.

51. A suspension for a disk drive, said suspension comprising:

a suspension arm;

a gimbal forming a distal portion of said suspension arm, said gimbal having a contact surface including at least one enclosure formed thereon, said enclosure defining an adhesive zone therein;

a slider attached to said gimbal at said adhesive zone; and said slider further includes a metallic portion formed thereon and aligned for contact with said adhesive zone.

52. A suspension for a disk drive, said suspension comprising:

a suspension arm;

a gimbal forming a distal portion of said suspension arm, said gimbal having a contact surface including means on said surface for forming an enclosure thereon, said means for forming an enclosure defining an adhesive zone therein;

a slider attached to said gimbal at said adhesive zone;

said means for forming an enclosure includes a plurality of walls, and a gap positioned between said walls; and said gap faces a center of said contact surface.

53. A suspension for a disk drive, said suspension comprising:

a suspension arm;

a gimbal forming a distal portion of said suspension arm, said gimbal having a contact surface including means on said surface for forming an enclosure thereon, said means for forming an enclosure defining an adhesive zone therein;

a slider attached to said gimbal at said adhesive zone; and said slider further includes a metallic portion formed thereon and aligned for contact with said adhesive zone.

54. A suspension for a disk drive, said suspension comprising:

a suspension arm;

a gimbal forming a distal portion of said suspension arm said gimbal having a contact surface including at least one enclosure formed thereon, said enclosure defining an adhesive zone therein;

a slider attached to said gimbal at said adhesive zone; and adhesive selectively applied to said adhesive zone for controlling the location and quantity of adhesive connecting the slider to the gimbal.

55. A suspension for a disk drive, said suspension comprising:

a suspension arm;

a gimbal forming a distal portion of said suspension arm, said gimbal having a contact surface including means on said surface for forming an enclosure thereon, said means for forming an enclosure defining an adhesive zone therein;

a slider attached to said gimbal at said adhesive zone; and adhesive selectively applied to said adhesive zone for controlling the location and quantity of adhesive connecting the slider to the gimbal.

* * * * *

UNITED STATES PATENT AND TRADEMARK OFFICE
CERTIFICATE OF CORRECTION

PATENT NO.    : 6,700,746 B1                                          Page 1 of 1
DATED         : March 2, 2004
INVENTOR(S)   : Brandt et al.

It is certified that error appears in the above-identified patent and that said Letters Patent is hereby corrected as shown below:

Column 5,
Line 66, replace "fir" with -- for -- therein.

Column 6,
Line 6, replace "Sat" with -- at -- therein.

Column 9,
Line 16, after "arm" insert -- , -- therein.

Signed and Sealed this

Sixth Day of July, 2004

JON W. DUDAS
*Acting Director of the United States Patent and Trademark Office*